United States Patent [19]

Colvin et al.

[11] Patent Number: 4,807,696

[45] Date of Patent: Feb. 28, 1989

[54] THERMAL ENERGY STORAGE APPARATUS USING ENCAPSULATED PHASE CHANGE MATERIAL

[75] Inventors: David P. Colvin, Apex; James C. Mulligan, Raleigh, both of N.C.

[73] Assignee: Triangle Research and Development Corp., Raleigh, N.C.

[21] Appl. No.: 131,189

[22] Filed: Dec. 10, 1987

[51] Int. Cl.⁴ .............................................. F28D 20/00
[52] U.S. Cl. ................................. 165/10; 165/104.11; 165/104.33; 126/400
[58] Field of Search .............................. 165/10, 104.11; 126/400, 430, 436

[56] References Cited

U.S. PATENT DOCUMENTS

| | | |
|---|---|---|
| 4,003,426 | 1/1977 | Best et al. . |
| 4,270,523 | 6/1981 | Heel ..................................... 126/436 |
| 4,283,925 | 8/1981 | Wildfeuer . |
| 4,335,781 | 6/1982 | Duffy . |
| 4,361,182 | 11/1982 | Michalak . |
| 4,362,207 | 12/1982 | Casali et al. ............................ 165/10 |
| 4,463,799 | 8/1984 | Takahashi et al. . |
| 4,512,388 | 4/1985 | Claar et al. . |
| 4,609,036 | 9/1986 | Schrader . |

FOREIGN PATENT DOCUMENTS

| | | | |
|---|---|---|---|
| 44998 | 2/1982 | European Pat. Off. .............. | 165/10 |
| 3005510 | 8/1981 | Fed. Rep. of Germany ........ | 165/10 |

Primary Examiner—Albert W. Davis, Jr.
Attorney, Agent, or Firm—Robert G. Rosenthal

[57] ABSTRACT

The invention relates to a thermal energy storage apparatus wherein a housing defines a chamber and wherein inlet and outlet means communicate with the chamber. A channelling means is positioned within the chamber for dividing the flow stream of a heat exchange fluid into a plurality of separate flow streams and for directing the heat exchange fluid to flow therethrough. Positioned within the channelling means is means for storing and releasing the thermal energy by heat transfer to and from the exchange fluid as the fluid passes in contacting relation with the thermal energy storing and releasing means as the fluid passes through the housing.

8 Claims, 2 Drawing Sheets

THERMAL ENERGY STORAGE APPARATUS USING ENCAPSULATED PHASE CHANGE MATERIAL

This invention was made with Government support under Contract No. NA58-35840 awarded by the National Aeronautics and Space Administration. The Government has certain rights in this invention.

FIELD OF THE INVENTION

This invention relates to the field of thermal energy storage units and more particularly to direct contact thermal energy storage units containing phase change materials.

BACKGROUND OF THE INVENTION

Many high energy technologies such as fusion energy and lasers, generate large quantities of waste heat within short time periods which must be removed quickly to prevent damage to the equipment. Other devices may require quick removal of thermal energy and may later require an input of thermal energy to maintain temperature. This temperature management can be achieved by the use of a thermal energy storage unit.

In general, thermal energy storage units or thermal capacitors must be able to rapidly store large quantities of heat at low cost and then return the energy source on to an energy dump for dissipation. For space applications, system size is also an important consideration in determining cost and overall system efficiency. A most efficient way to store thermal energy rapidly is by using the "heat of fusion" phenomenon. More specifically, as a material melts, it absorbs relatively large quantities of energy, thereby cooling the heat exchange medium. In the reverse process, the phase change material cools down and freezes, or solidifies, thereby releasing large quantities of energy. Phase change substances commonly used for this purpose include crystalline polyolefins, chlorides and nitrates as well as other materials. For applications at higher temperatures, metals can be used, particularly sodium, lithium, and various alloys of bismuth, lead, tin, cadmium and indium.

Thermal energy storage units using a phase change material usually consist of a vessel filled with bulk phase change material with a a metal pipe heat exchanger embedded therein. A fluid such as water is passed through the heat exchanger to transfer heat into and out of the phase change material. The heat transferred is limited by the surface of the metal pipe heat exchanger.

In recognition of the above described limitation, thermal energy storage units were developed wherein the heat absorbing substance is encapsulated to increase the heat transfer surface area. However, these systems are not without their drawbacks as the pressure required to pump the heat transfer medium through the apparatus is relatively high. The higher pumping pressure requires an increase in energy consumption by the pump. When pumping pressure is high, capsule breakage becomes a problem with systems of this type. It is important that the encapsulating shell material remain solid and structurally sound throughout the heat exchange process to prevent the melted material contained in the capsule from coalescing into larger masses and flowing out of the thermal energy storage unit, or plugging orifices. In addition, should the capsules degrade or rupture, system contamination and degradation of system performance will occur.

In view of the foregoing it is an object of the present invention to provide a thermal energy storage apparatus which has a low pressure drop.

Another object of the invention is to provide a thermal energy storage apparatus with low energy requirements to pump the heat exchange medium.

Another object of the present invention is to provide a thermal energy storage device having a high capacity for thermal energy absorption and/or release.

A further object of the invention is to provide a thermal energy storage apparatus wherein the capsules containing the heat storage material are less likely to break, thereby decreasing the risk of contamination and increasing system stability and reliability.

SUMMARY OF THE INVENTION

To accomplish the objects described above, there is provided a thermal energy storage apparatus comprising a housing defining a chamber including spaced apart inlet means and outlet means communicating with said chamber. Channelling means are provided within the chamber for directing the heat exchange fluid to flow from the inlet means through the housing to the outlet means. Means for storing and releasing thermal energy to and from a heat exchange fluid are provided. The storing and releasing means are positioned within the channelling means whereby the heat exchange fluid temperature is regulated as the heat exchange fluid passes in contacting relation with the thermal energy storing and releasing means as it passes through the housing.

BRIEF DESCRIPTION OF THE DRAWINGS

Some of the features and advantages of the Invention having been briefly stated, others will appear from the detailed description which follows, when taken in connection with the accompanying drawings, in which.

DETAILED DESCRIPTION OF THE ILLUSTRATED EMBODIMENT

While the present invention will be described more fully hereinafter, it is to be understood at the outset that persons of skill in the art may modify the invention herein described while still achieving the favorable results of this invention. Accordingly, the description which follows is to be understood as being a broad teaching disclosure directed to persons of skill in the appropriate arts, and not as limiting upon the present invention.

Figure 1:
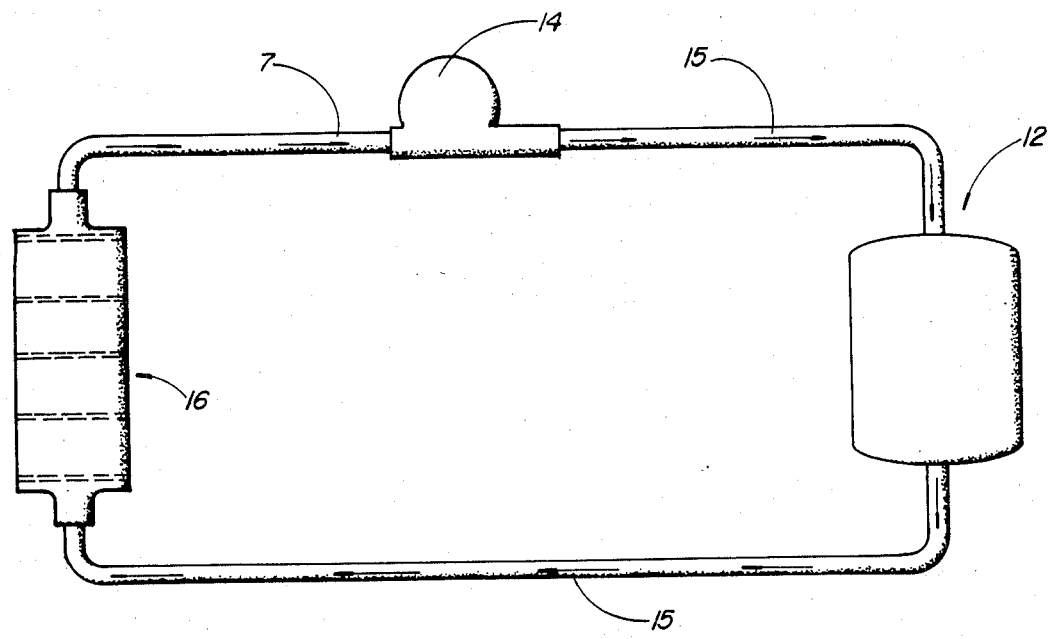
FIG. 1 is a schematic view of the thermal energy storage apparatus of the present invention incorporated into a closed loop thermodynamic system.

Referring more specifically to the drawings, and particularly to FIG. 1, a schematic thermodynamic system is there illustrated. As is known to persons skilled in the art, the system included a heat source 12, a pump 14, and a heat sink or thermal energy storage apparatus 16 of the present invention. A conventional pump 14 is used to circulate a heat transfer medium such as a fluid F through the system. In operation, the heat source 12, such as a laser or fusion energy system or any system which requires the removal or application of thermal energy in order to maintain its operational capabilities and to prevent damage to the system. The fluid F is circulated by means of pump 14 through the heat source 12 to the thermal energy storage apparatus or "thermal capacitor" before being returned to the heat source as shown by the arrows in FIG. 1. The waste thermal energy generated by the heat source is transferred from fluid F to the storage apparatus 16 as a result of the thermal gradient therebetween.

Figure 2:
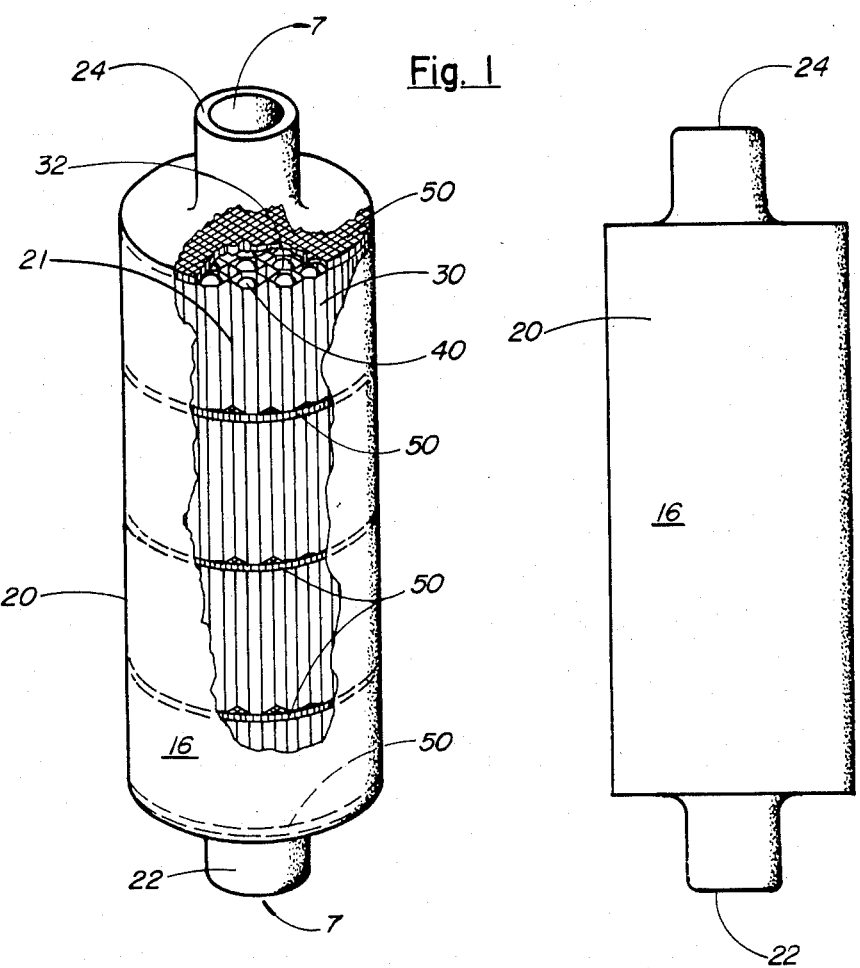
FIG. 2 is a perspective view partially cut away of the thermal energy storage apparatus of the present invention.
Figure 3:
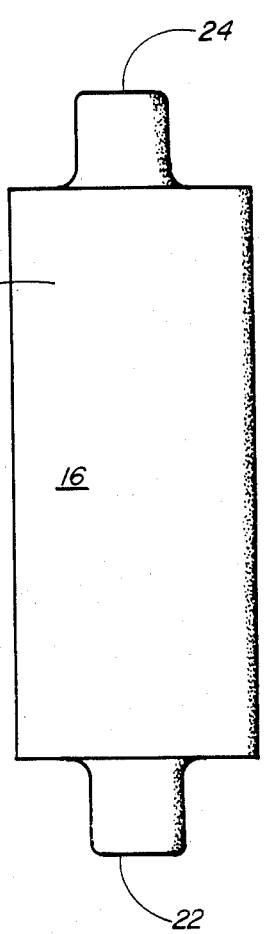
FIG. 3 is a side view of the thermal energy storage apparatus of the present invention.
Figure 4:
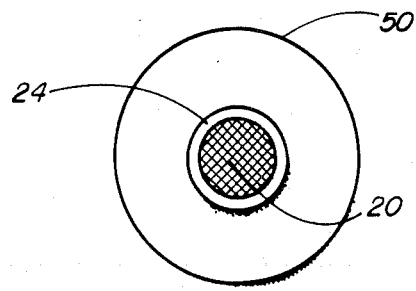
FIG. 4 is an end view of the thermal energy storage apparatus of the present invention.
Figure 5:
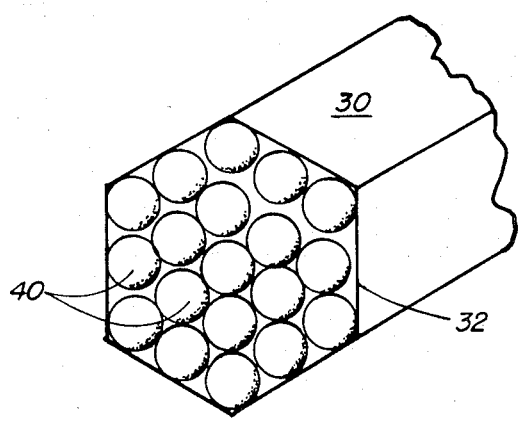
FIG. 5 is a partial perspective view of a single section of honeycomb of the present invention showing macrocapsules containing the phase change material positioned therein.

The thermal energy storage apparatus 16 comprises a housing 20 which may be constructed out of any suitable material such as stainless steel, aluminium, structural plastics, etc. As shown in FIG. 2, the housing 20 is an elongate cylinder defining a chamber 21 and includes an inlet means 22 and an outlet means 24 located at opposite ends of the housing and communicating with chamber 21. The inlet means 22 and the outlet means 24 are designed to receive appropriate piping P as shown in FIG. 1.

Disposed within the chamber 21 is a channelling means 30 which includes a plurality of elongate parallel passages 32. The channelling means 30 stabilizes the position of thermal energy storaging and releasing means 40, aids in directing the flow of heat exchange fluid F from inlet means 22 through chamber 21 to outlet means 24, and aids in preventing flow blockage due to capsule deformation caused by fluid flow pressure. As illustrated in F channelling means 30 takes the form of an elongate honeycomb matrix. The channelling means 30 extends along substantially the entire length of housing means 20 and includes a plurality of hexagonal shaped passages 32 that are parallel with the inlet means 22 and the outlet means 24. The honeycomb matrix may be constructed from aluminium or other suitable material. The number, shape and size of the channelling passages 32 must be sized to the diameter and length of the housing and the size of the thermal energy storaging and releasing means. In the limiting case of large diameter thermal energy storing and releasing means, and a small diameter housing, channelling means may not be needed, whereas with a large housing and very small diameter storage means 40 may require many small channelling means for optical performance.

Figure 6:
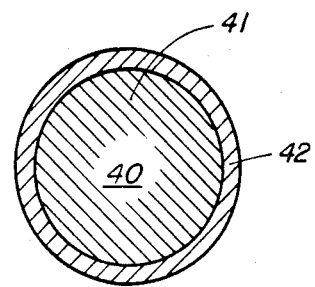
FIG. 6 is a cross section of a macrocapsule of the present invention containing a phase change material.

The thermal energy storaging and releasing means 40 in the illustrated embodiment in FIG. 2 comprises a plurality of macrocapsules having a diameter in the range of 200–3,500 microns, as shown in FIG. 6. The capsules consist of a core material 41 having a melting point and other characteristics chosen for the particular application, and an encapsulating outer shell 42 whose purpose is to contain the core material in the defined shape above the melting temperature of the core material, and to prevent the fusion of separate bodies of core material in the melted state.

Typical core materials for applications in the 20 C. to 185 C. temperature range are paraffin waxes. For example n-eicosane has a melting point of 36 C., a latent heat of fusion of 90 BTU/lb, a specific heat of 0.5 BTU/lb, and a density of 52 lb/cu.ft. Typical wall materials for this temperature range are phenolic type resins which are stable to much higher temperatures than the core. For higher temperature applications, metals can be used for the core material, particularly sodium, lithium, and various alloys, of bismuth, lead, tin, cadmium, and indium. Wall materials can be copper, nickel, and other higher temperature metals electroplated over the core material. Those skilled in the art will recognize that there are many possible combinations of core and wall materials which could be used, and this list is intended to be illustrative only.

In the illustrated embodiment channelling means or honeycomb 30 is filled with macrocapsules 40 to yield a void fraction for the macrocapsules alone of approximately 39%. The void fraction of the entire apparatus, including the honeycomb 30 is approximately 45%, with the difference being attributable to the presence of the aluminium honeycomb 30. This additional void fraction s critical to pump energy efficiency and serves to minimize the pressure drop through the housing.

Thermal energy apparatus 16 also includes stabilizing means or wire mesh screens 50 as illustrated in FIG. 2 for stabilizing the thermal energy storing means 40. The stabilizing means comprises a coarse and a fine stainless steel wire mesh screen located at both ends of the honeycomb and at intervals therebetween. The fine screen is attached to the honeycomb via suitable means such as welding. The fine screen in the model that was constructed was spot welded at six locations along each hexagonal cell. A second coarser stainless steel screen wire mesh (not shown) supports the fine wire mesh screen. These mesh screens prevent blocking or clogging of the inlet means and outlet means by he macrocapsules or any portion thereof which may break or otherwise become detached.

In operation, a thermal energy containing fluid F is pumped through the system as shown in FIG. 1. It enters the thermal energy storage apparatus 16 through inlet means 22 and screens 50 where it is divided into a plurality of separate flow streams as defined by the channelling means 30. The fluid passes around and in contacting relation with the macrocapsules as it flows down the length of channelling means 30 and as a result of the temperature gradient therebetween, thermal energy is transferred between the fluid and the macrocapsules for heating or cooling of the fluid F as appropriate. The fluid then exits the apparatus through outlet means 24 and continues through the system.

The foregoing embodiments and examples are to be considered illustrative, rather than restrictive of the invention, and those modifications which come within the meaning and range of equivalence of the claims are to be included therein.

That which is claimed is:

1. A thermal energy storage apparatus comprising:
    a housing defining a chamber including spaced apart inlet means and outlet means communicating with said chamber,
    channelling means subdividing the interior area of said chamber into a plurality of substantially equal area subchambers positioned within said chamber for dividing the flow stream of a heat exchange fluid into a plurality of separate flow streams and for directing the heat exchange fluid to flow from the inlet means through the chamber to the outlet means, and
    macroencapsulated means for storing and releasing thermal energy by heat transfer to and from the heat exchange fluid, said storing and releasing means being positioned within said channelling means whereby the heat exchange fluid temperature is regulated as the heat exchange fluid passes in contacting relation with said thermal energy storing and releasing means as it passes through said housing.

2. A thermal energy storage apparatus according to claim 1 further including stabilizing means for stabilizing said means for storing and releasing thermal energy positioned in and extending across said channelling means and providing substantially free flow of the heat exchange fluid therethrough.

3. A thermal energy storage apparatus according to claim 2 wherein said stabilizing means comprises a screen positioned at a predetermined location across said channelling means and connected thereto.

4. A thermal energy storage apparatus according to claim 1 wherein said macroencapsulated means for storing and releasing thermal energy to the heat exchange fluid comprises capsules containing a thermal energy storage material.

5. A thermal energy storage apparatus according to claim 4 wherein said thermal energy storage material comprises phase change material.

6. A thermal energy storage apparatus according to claim 4 wherein said macroencapsulated means for storing and releasing thermal energy to the heat exchange fluid comprises a phase change material encapsulated in an impervious shell, and wherein said phase change material is contained therein in all phase states.

7. A thermal energy storage apparatus according to claim 1 wherein said channelling means comprises an elongate honeycomb matrix including a plurality of passages.

8. A thermal energy storage apparatus comprising:
   a housing defining a chamber including spaced apart inlet means and outlet means communicating with said chamber,
   a plurality of elongate parallel passages subdividing the interior area of said chamber into a plurality of substantially equal area subchambers positioned within said housing and oriented for dividing the flow stream of a heat exchange fluid into a plurality of separate flow streams and means through the chamber to the outlet means,
   a plurality of macrocapsules containing a phase change material positioned within said elongate parallel passages, and
   a plurality of screens located at preselected positions along the length of said elongate parallel passages and connected to said passages, each of said screens extending across said elongate parallel passages and having openings sized so as to retain said macrocapsules and any fragments thereof within said chamber as a heat exchange fluid flows through said chamber.

* * * * *